United States Patent Office.

HUGH SMITH, OF SAN FRANCISCO, CALIFORNIA

Letters Patent No. 108,199, dated October 11, 1870.

IMPROVEMENT IN WASHES FOR THE CURE OF SCAB IN SHEEP, &c.

The Schedule referred to in these Letters Patent and making part of the same

*To all whom it may concern:*

Be it known that I, HUGH SMITH, of the city and county of San Francisco, State of California, have invented a certain new and "improved Wash," for the Cure of Scabes or Scab in Sheep; and I do hereby declare that the ingredients used and the manner of mixing or compounding them to make the said wash, and the manner of applying or using the same when compounded, are described in the following specification.

I take one (1) ounce of hyd. bi-chloride or corrosive sublimate; one-half (½) ounce sal ammoniac or muriate of ammonia; one-half (½) ounce saltpeter or nitrate potassa; one-half (½) ounce arsenic.

Dissolve the above in a pint of hot water, and add to it five (5) gallons of strong tobacco-water or brine.

I prefer a solution of salt as a vehicle, as it is not so liable to injure the skin of the sheep, the tendency being to somewhat neutralize the effect of the poison employed.

I apply the solution from a bottle, with a sponge, to the skin of the sheep, rubbing it in thoroughly with the hand.

As serious doubts may be entertained as to the effect of the poison used in this preparation, upon the sheep, I would here remark that I have employed the wash with marked success upon flocks that have been badly affected with scab, and in no instance has the application of the preparation been attended with fatal results.

In a short time the scab will raise from the skin, and the wool commence to grow, while the animal assumes a healthy appearance again.

Having thus described my invention,

What I claim, and desire to secure by Letters Patent, is—

A wash for sheep, made of the ingredients herein specified, and mixed and compounded substantially as set forth.

In testimony whereof, I have hereunto set my hand and seal.

HUGH SMITH. [L. S.]

Witnesses:
 C. W. M. SMITH,
 JOHN SROUFE.